US007869833B2

(12) United States Patent
Kim

(10) Patent No.: US 7,869,833 B2
(45) Date of Patent: Jan. 11, 2011

(54) EVENT DISPLAY APPARATUS FOR MOBILE COMMUNICATION TERMINAL AND METHOD THEREOF

(75) Inventor: Huhn Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 1087 days.

(21) Appl. No.: 11/491,132

(22) Filed: Jul. 24, 2006

(65) Prior Publication Data

US 2007/0060205 A1 Mar. 15, 2007

(30) Foreign Application Priority Data

Sep. 9, 2005 (KR) .................. 10-2005-0084340

(51) Int. Cl.
*H04M 1/00* (2006.01)

(52) U.S. Cl. .............. 455/566; 455/466; 455/550.1; 705/5; 705/6; 705/7; 705/8; 705/9

(58) Field of Classification Search ........... 455/414.1, 455/456.1, 566, 406, 550.1, 466; 379/210.01, 379/207.15; 707/100, 204, 7; 705/5–9
See application file for complete search history.

(56) References Cited

U.S. PATENT DOCUMENTS

| 6,092,067 | A  | * | 7/2000 | Girling et al. .............. 707/100 |
| 2002/0004734 | A1 | * | 1/2002 | Nishizawa .................. 705/9 |
| 2004/0075701 | A1 | * | 4/2004 | Ng .......................... 345/867 |
| 2005/0075097 | A1 | * | 4/2005 | Lehikoinen et al. ...... 455/414.1 |
| 2005/0177404 | A1 | * | 8/2005 | Hyttinen ...................... 705/7 |
| 2006/0148528 | A1 | * | 7/2006 | Jung et al. ................. 455/566 |

FOREIGN PATENT DOCUMENTS

| EP | 1298 895 A2 | 4/2003 |
| JP | 6161964 A | 6/1994 |
| JP | 7-296079 | 11/1995 |
| JP | 9-297739 | 11/1997 |
| JP | 11-085450 | 3/1999 |
| JP | 2001-075894 | 3/2001 |
| JP | 2001297065 A | 10/2001 |
| JP | 2002-111794 | 4/2002 |
| JP | 2002-175250 | 6/2002 |
| JP | 2003-152859 | 5/2003 |
| JP | 2005-079840 | 3/2005 |
| JP | 2005149261 A | 6/2005 |
| WO | WO 2004/074778 A1 | 9/2004 |
| WO | WO 2005/033828 | 4/2005 |
| WO | WO 2005/033828 A2 | 4/2005 |

* cited by examiner

*Primary Examiner*—Nick Corsaro
*Assistant Examiner*—Sarwat Chughtai
(74) *Attorney, Agent, or Firm*—McKenna Long & Aldridge LLP

(57) ABSTRACT

A mobile communication terminal including a memory unit configured to store at least one call related event, a display configured to display a time line, and a controller configured to display the at least one call related event on the time line based on a time information of the at least one call related event. Further, the time line includes a circular-shaped time line, a chart-shaped time line, a spiral-shaped time line, a snowman-shaped time line, a star-shaped time line, a rectangular-spiral-shaped time line, or a square-shaped time line.

29 Claims, 8 Drawing Sheets

EVENT DISPLAY APPARATUS FOR MOBILE COMMUNICATION TERMINAL AND METHOD THEREOF

This application claims priority to Korean Application No. 10-2005-0084340 filed in Korea on Sep. 9, 2005, the entire contents of which is incorporated by reference in its entirety.

BACKGROUND OF THE INVENTION

1. Field of the Invention

The present invention relates to a mobile communication terminal, and more particularly, to a mobile terminal and corresponding method that displays various call related and other events on a time line on the display of the terminal.

2. Description of the Related Art

A mobile communication terminal such as a mobile (portable) phone and a personal digital assistant (PDA) in accordance with the related art records events such as received, sent and missed calls into a call list, and records events such as received or sent text messages into a message storage file. The related art mobile terminal also records schedule events in a schedule box, and records events such as an alarm and a wake up call in a menu storage file.

However, the related art mobile communication terminal records the various events in a separate manner, so that a user has a difficulty in certifying and managing the various events.

SUMMARY OF THE INVENTION

Accordingly, one object of the present invention is to address the above-noted and other problems.

Another object of the present invention is to provide an event display apparatus and method for a mobile communication terminal that allows a user to easily certify and manage various events by collecting the various dispersed events and then displaying the collected events on various time lines.

Another object of the present invention is to provide an event display apparatus and method for a mobile communication terminal that allows a user to easily certify and manage various events related to past, present, and future times by collecting and displaying the various past, present and future events on a respective past, present, and future time line.

To achieve these and other advantages and in accordance with the purpose of the present invention, as embodied and broadly described herein, there is provided in accordance with one aspect of the present invention, a mobile communication terminal including a memory unit configured to store at least one call related event, a display configured to display a time line, and a controller configured to display the at least one call related event on the time line based on a time information of the at least one call related event. Further, the time line includes a circular-shaped time line, a chart-shaped time line, a spiral-shaped time line, a snowman-shaped time line, a star-shaped time line, a rectangular-spiral-shaped time line, or a square-shaped time line. The present invention also provides a related computer program product.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
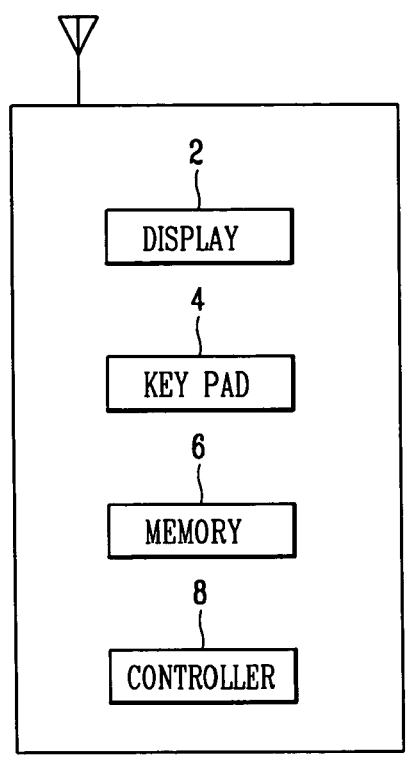
FIG. 1 is a block diagram of a mobile communication terminal in accordance with an embodiment of the present invention.

Turning first to FIG. 1, which illustrates a mobile communication terminal according to an embodiment of the present invention. As shown, the mobile terminal includes a display 2, a keypad/input device 4, memory 6 and a controller 8. The controller 8 detects events stored in the memory 6 and displays the detected events on a timeline on the display 2.

Figure 2:
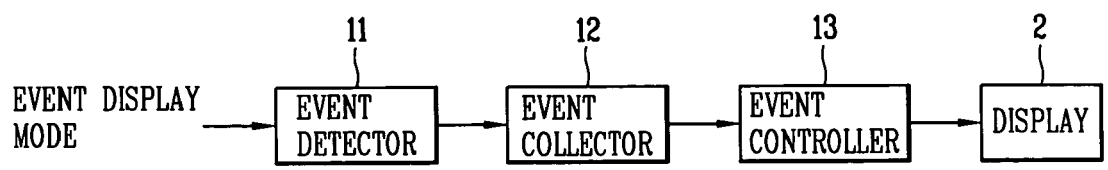
FIG. 2 is a block diagram showing an event display apparatus for a mobile communication terminal in accordance with an embodiment of the present invention.

In more detail, FIG. 2 is a block diagram showing an event display apparatus for a mobile terminal in accordance with an embodiment of the present invention. As shown in FIG. 2, the event display apparatus includes an event detector 11 for detecting events of the mobile terminal, an event collector 12 for collecting the detected events, and an event controller 13 for displaying a preset time line on the display 2 of the mobile terminal and displaying the collected events on the time line. The controller in FIG. 1 performs the operations of the event detector 11, event collector 12 and event controller 13.

Further, the events generated for the mobile terminal inform the users about calls received, sent, and missed, about messages received and sent, and about schedule information, an alarm, a wakeup call, task events, D-day events, and reservation message events, etc. (hereinafter, referred to as "various events").

Further, the time lines displayed on the display 2 by the controller 8 may have a circular type shape, a chart type shape, and a spiral type shape. In addition, a variety of other timeline shapes may be used, such as a snowman, Christmas tree shape or other seasonal type shapes, a star shape, a rectangular or spiral square shape, etc. The different timelines will be discussed in more detail below. Also, the event controller 13 displays the various events collected by the event collector 12 on the different shaped time lines. In addition, the event controller 13 displays each event as an icon on the time lines. Accordingly, the various events have a time series order.

In addition, as time elapses, the event controller 13 appropriately changes the positions of the events displayed on the timeline. For example, when a new day arrives (e.g., 12:00 AM), the event controller 13 moves the events displayed on today's time line (which is now yesterday) onto yesterday's time line.

Figure 3:
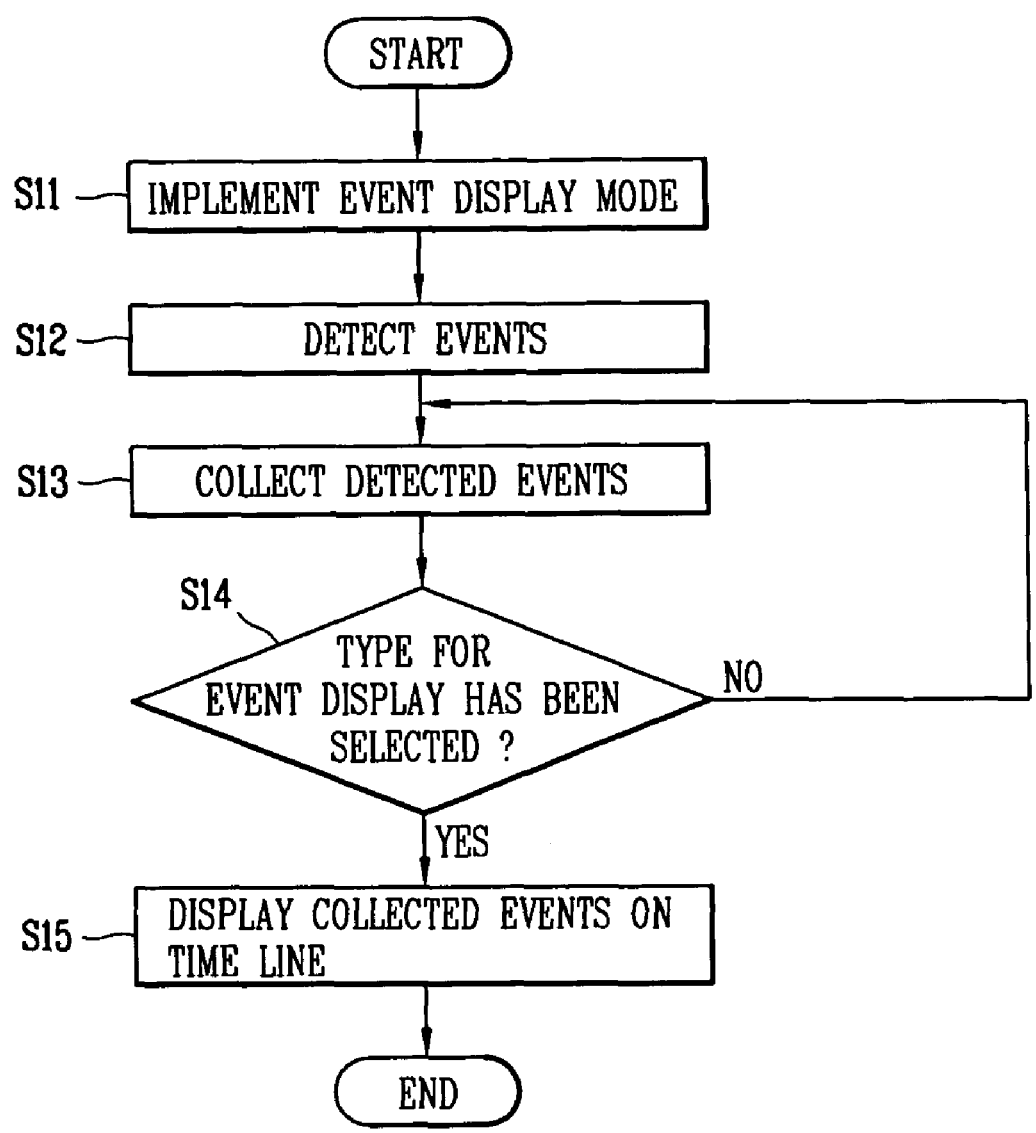
FIG. 3 is a flowchart showing an event display method for a mobile communication terminal in accordance with an embodiment of the present invention.

Next, an operation of the event display apparatus for a mobile communication terminal in accordance with an embodiment of the present invention will be explained with reference to the flowchart of FIG. 3. As shown in FIG. 3, when a mode of the mobile terminal is changed into an event display mode (S11), the event detector 11 detects the various events generated by the mobile terminal, and then outputs the detected events to the event collector 12 (S12). For example, the event detector 11 detects the various events such as calls received, sent, and missed, about messages received and sent, and about schedule information, an alarm, a wakeup call, task events, D-day events, reservation message events, etc., and then outputs the detected events to the event collector 12.

Then, the user may select a particular time line that he or she prefers (e.g., a circular type, a chart type, a spiral type, etc.) (S14), and the event controller 13 then displays the collected events on the selected time line (S15). For instance, when the user selects a circular type time line, the event controller 13 displays icons corresponding to the collected events on a displayed circular type time line. In addition, when the user selects a chart type time line or a spiral type time line, the event controller 13 displays the icons on the respective time line. The different types of time lines are shown in FIGS. 4-7 and will be discussed in more detail below.

Further, a default time line may be selected by the user, in which the events are displayed on the default time line until changed by the user. This is particularly advantageous, because the user may become more familiar reading a particular type of time line over a period of use. Also, a particular time line may be selected by the user or downloaded from the Internet. For example, during the Christmas season, a user may want to select a Christmas related time line such as a picture of a snowman. Thus, in this instance, the user can access the wireless Internet from their cell phone and log onto a website such as LGE.COM/timelines to download a particular timeline. A variety of other time line shapes may also be provided.

In addition, when the user selects a specific icon positioned on the time line, the event controller 13 executes a program corresponding to the selected icon. For example, if a scheduling icon is selected, the scheduling task is executed.

In addition, when the user selects a specific time on the time line, the event controller 13 sets and/or registers events requested by the user to the specific time. For instance, when the user selects 5:00 PM on the circular time line, the event controller 13 displays items for setting various events on the display 2. When the user selects an alarm item among the items, the event controller 13 automatically sets the alarm to be 5:00 PM on the time line. Accordingly, the user can easily set the alarm just by selecting a specific time on the time line without an additional time setting.

In addition, when a specific event displayed on the time line is selected by the user, the specific event is performed or changed by the user's request, and then the detailed information of the selected specific event is displayed on the display 2. These features will be discussed in more detail below.

Figure 4A:
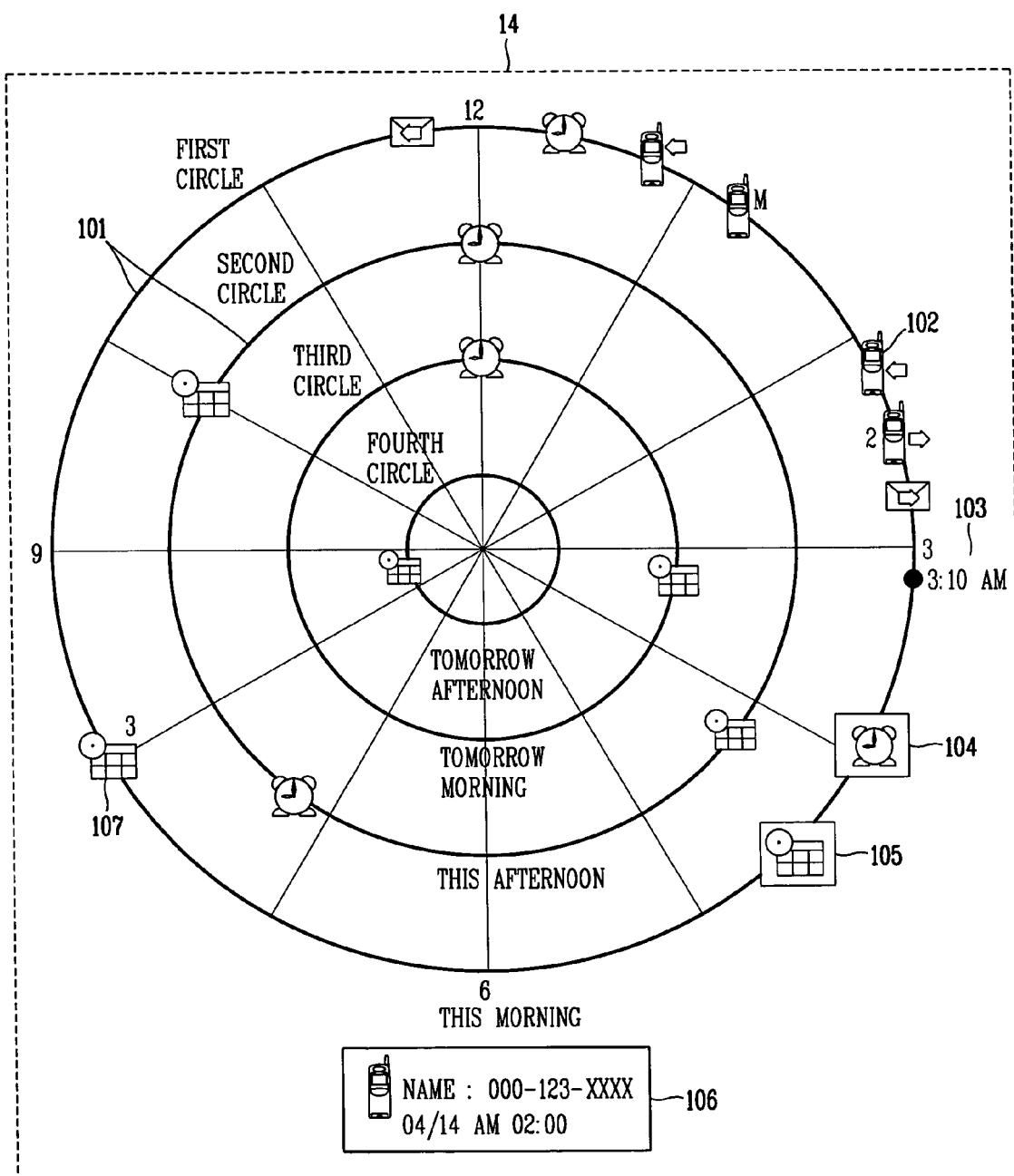
FIGS. 4A and 4B are overviews showing a method for displaying events on a circular-shaped time line in accordance with an embodiment of the present invention.

Next, a method for displaying events on a circular type time line will be explained with reference to FIG. 4A. As shown in FIG. 4A, the event controller 13 displays circular time lines 101 on the display 2 and displays icons representative of the various collected events output from the event collector 12 on the time line. As shown, the circular-shaped time line includes a plurality of circles 101 for representing real time events. In more detail, as shown in the embodiment in FIG. 4A, a first circular time line represents this morning, a second circular time line represents this afternoon, a third circular time line represents tomorrow morning, and a fourth circular time line represents tomorrow afternoon. For example, 03:00 on the first circular time line indicates 3:00 AM today, 03:00 on the second circular time line indicates 3:00 PM today, 03:00 on the third circular time line indicates 3:00 AM tomorrow, and 03:00 on the fourth circular time line indicates 3:00 PM tomorrow.

Figure 4B:
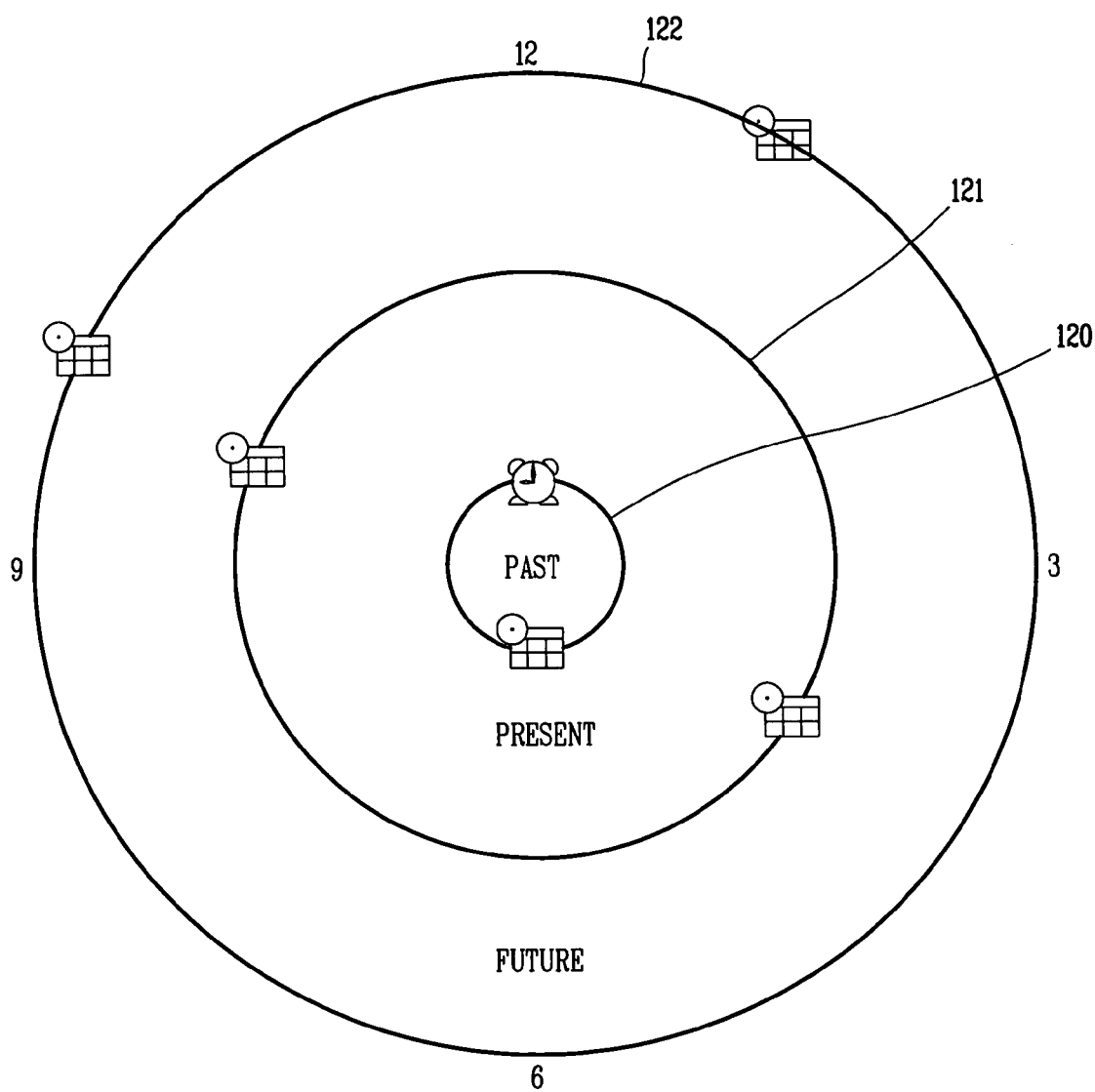

Alternatively, as shown in FIG. 4B, the circular time lines may be used to represent a present time, a past time and a future time. For example, an innermost circle 120 may be used to represent a past time, a middlemost circle 121 may be used to represent a present time and an outermost circle 122 may be used to represent a future time. Thus, the user is able to easily view and manage past, present and future events.

In addition, the respective sizes or diameters of the circles shown in FIGS. 4A and 4B are set to be different from each other. Also, the width of the respective circles may be set differently allowing the user to easily distinguish the different periods of the day. Further, as discussed above, the time lines may represent not only a present time and a future time (e.g., tomorrow), but also a past time (e.g., yesterday).

In addition, as shown in FIG. 4A, the event controller 13 displays a present time 103 on the appropriate circular time line. For example, the present time is preferably displayed on the first or second circular time lines, each representing today. Further, as time lapses, the event controller 13 changes the size of each icon corresponding to the events displayed on the display unit 14. That is, the event controller 13 sets an icon corresponding to an event positioned on the present time line (or on a time line for representing today) to have a larger size than an icon corresponding to an event positioned on the future time line or the past time line. For example, as shown in FIG. 4A, the clock icon and the scheduling icon are displayed to have a larger size on the outermost time line 101 than on the inner time lines 101.

Also, for various events such as unidentified messages, missed calls, an alarm, etc., an icon 102 corresponding to the event (e.g., missed call in FIG. 4A) is In addition, when the same kind of events overlap with each other at the same time on the same time line, the event controller 13 preferably displays the number of the overlapped events on the display unit 14. For example, as shown in FIG. 3, if three events of the same kind correspond to 8:00 AM today, the event controller 13 displays one icon 107 among the three icons corresponding to the three events on the display unit 14 with the number "3" on or next the single icon 107.

Further, when different kind of events correspond to the same time, the event controller 13 displays a single icon 105 on the corresponding time line according to priority, and overlaps the rest of the icons on the single icon 105. For example, the scheduling icon 105 partially overlaps other icons such as an alarm icon, missed call icon, etc., if the scheduling icon 105 has a higher priority than the other partially overlapped icons. The priorities of each event/icon can be manually set by the user or can be predetermined priorities. For example, the scheduling events may be designated a higher priority than missed call events.

Also, when icons corresponding to plural events are positioned on a specific time line, and the current time is approaching a specific event, the event controller 13 preferably displays the specific event with an alert color (e.g., red) to warn the user. In more detail, with reference to FIG. 4A, assume the current time is 7 PM). Thus, in this instance, when the time approaches close to the scheduling icon 107 at 8M, the event controller 13 flashes or blink the scheduling icon 107 using a red color, for example. The period of time before the event is flashed can be manually set by the user, or can be a predetermined default value (e.g., 30 minutes before the event occurs). controlled to flash or blink to inform the user that the event (e.g., missed call) exists. Further, when the user places the cursor over the icon such as the icon 102 in FIG. 4A, the event controller 13 displays summary information 106 on the display 2 through a pop-up window, for example. Then, if the user again clicks the icon 102, the controller 13 displays more detailed information on the display 2.

In addition, when the user selects a 'menu' icon according to an event on which the cursor is currently positioned, various functions such as transmitting a message, blocking a message, replying to a message, deleting a message, etc. are provided. For example, the user may place the cursor over a particular icon and click a button or key on the mobile terminal to pop up a menu allowing the user to perform various functions related to a particular icon such as transmitting a message, blocking a message, etc.

Further, when the user selects up-down direction keys located on a key pad 4 (see FIG. 1) of the mobile terminal, the event controller 13 moves the cursor 104 from the first circular time line to the second circular time line. Note, FIG. 4A illustrates the cursor 104 being on the clock icon on the outer circle 101. Accordingly, the user can select a desired circular time line by using the up and down direction keys. Further, when the user selects right and left direction keys on the key pad 4 of the terminal, the event controller 13 moves the cursor 104 along the circular time line. Accordingly, the user can select or highlight a desired icon positioned on the circular time line using the right and left and up and down direction keys, thereby easily certifying and managing a specific event. The right, left, up and down keys may also be provided separately from the key pad, such as on a side of the mobile terminal.

Further, different period of times may be set for different events (e.g., a time period for warning the user about scheduling events may be set for 30 minutes, while a time period for warning a user about a Dday event may be set of 3 hours). Also, some events may be set not to flash or blink while others can be set to blink or flash. That is, the user may desire to be warned about scheduling events and not be warned about alarm events. Any type of alarm may be provided to warn the user (e.g., sound alarm, flashing or blinking, etc.).

Further, in one embodiment of the present invention, the particular event is automatically performed without the user's interaction when the respective time occurs. For example, the user may set a call event for 5:00 PM on Friday evening to call home. Thus, when 5:00 PM Friday occurs, the numbered stored for his home is automatically dialed. Thus, the user can be assured that an important phone call is automatically dialed. A sounding alarm, for example, may also be used to indicate to the user that the event is automatically being performed.

Figure 5:
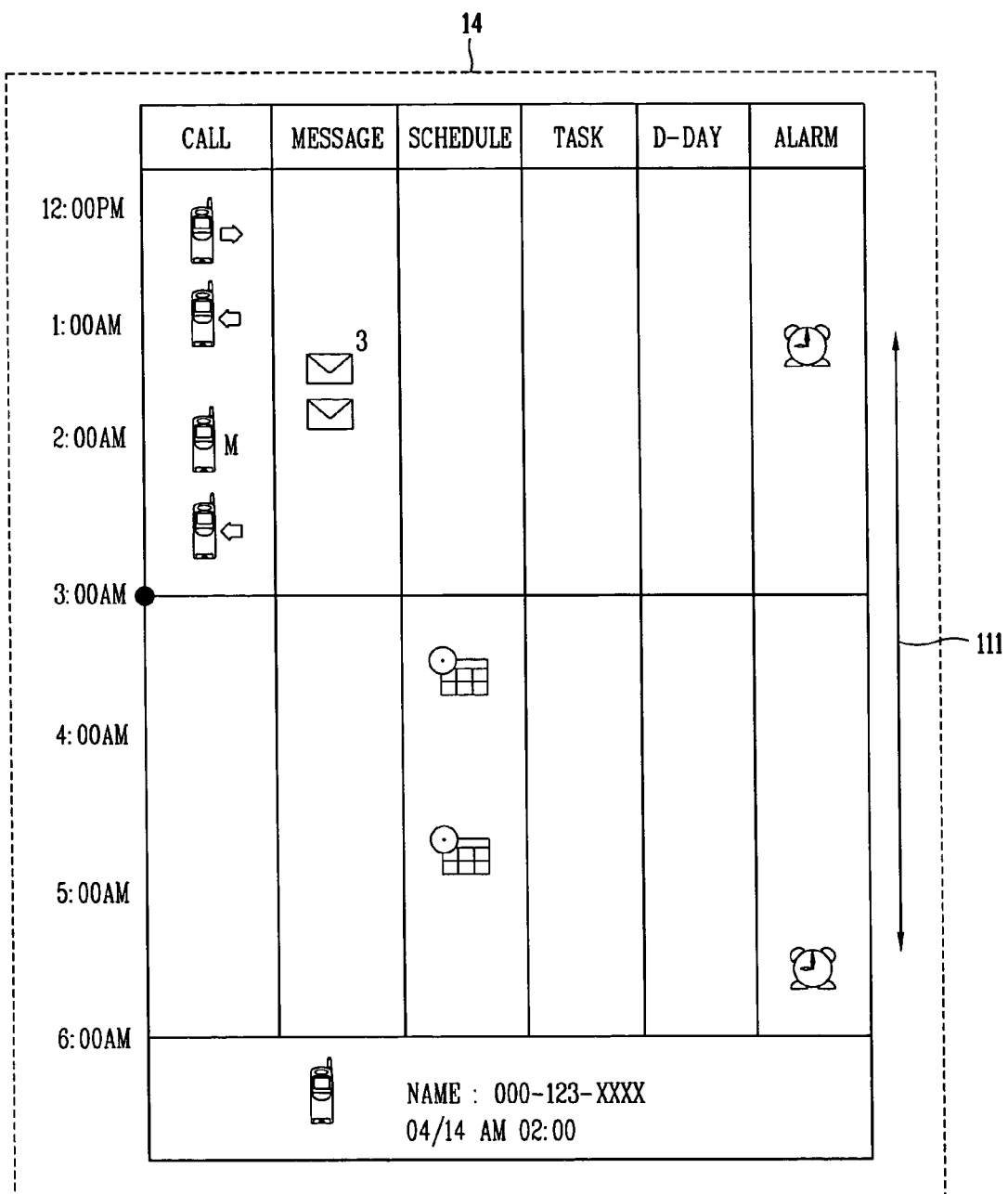
FIG. 5 is an overview showing a method for displaying events on a chart-shaped type time line in accordance with an embodiment of the present invention.

Turning next to FIG. 5, which is an overview showing a method for displaying events on a chart type time line in accordance with an embodiment of the present invention. As shown in FIG. 5, the event controller 13 displays icons corresponding to events collected by the event collector 12 on the chart type time line. As shown, the chart type line includes times on the vertical axis and events on the upper horizontal axis to create a chart. Further, the user can certify and manage the icons positioned on the chart type time line using a scroll bar 111. A horizontal scroll bar (not shown) may also be used to scroll the events if necessary. Further, the chart type time line has the same function as that of the circular type time line, and therefore a detailed explanation is omitted.

Figure 6:
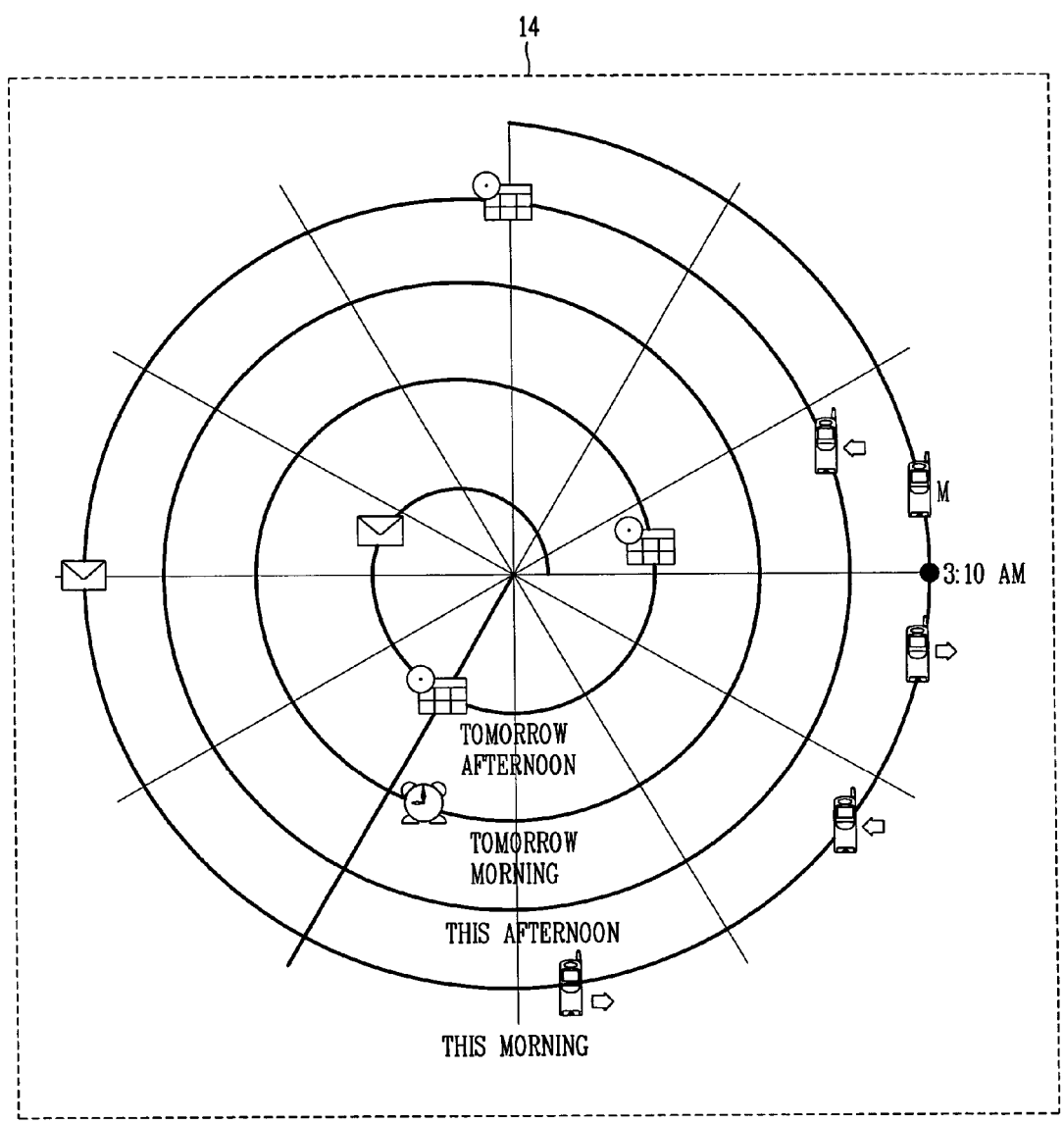
FIG. 6 is an overview showing a method for displaying events on spiral-shaped time line in accordance with an exemplary embodiment of the present invention.

In addition, FIG. 6 is an overview showing a method for displaying events on a spiral type time line in accordance with an embodiment of the present invention. As shown in FIG. 6, the event controller 13 displays icons of events collected by the event collector 12 on the spiral type time line. As shown, the spiral-shaped time line includes a first spiral time portion for representing a present morning time, a second spiral time portion for representing a present afternoon time, a third spiral time portion for representing a future morning time and a fourth spiral time portion for representing a future afternoon time. Thus, the user can certify and manage events through the icons positioned on the spiral time lines. Similar to the above description with respect to the chart type time line, the spiral type time line has the same function as that of the circular type time line, and therefore a detailed explanation is omitted.

In addition, the event controller 13 preferably provides a zoom in/out function so that the user can easily certify and manage the collected events. For example, the zoom in/out function allows the user to zoom in/out of a particular group of icons or a particular icon thereby allowing the user to see more clearly the particular icon. The zoom/in out function may also zoom in/out a particular portion of the time line (e.g., the upper right quadrant of the time line. Alternatively, the zoom in/out function may be configured to allow the user to select a particular time line and then only display the selected line. For example, with reference to FIG. 4A, the user may desire that only the outer time line 101 be displayed (i.e., and not have the inner time lines 101 be displayed). The zoom in/out function may be provided by designating a particular key on the mobile terminal or may be provided as a user menu option.

Figure 7A:
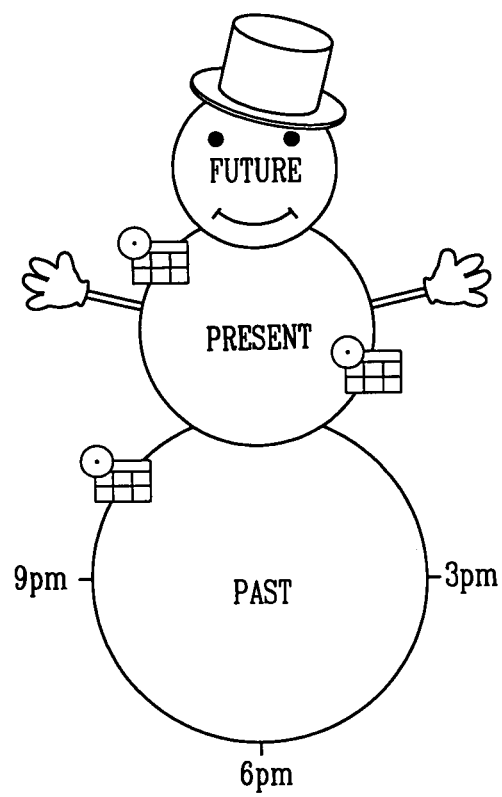
FIGS. 7A-7D are overviews illustrating a variety of different shaped timelines.
Figure 7B:
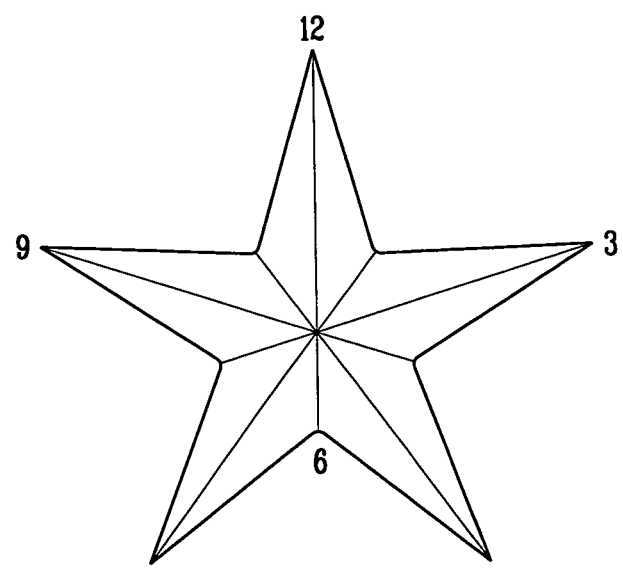
Figure 7C:
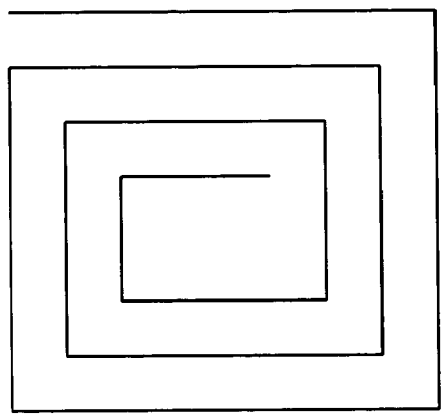
Figure 7D:
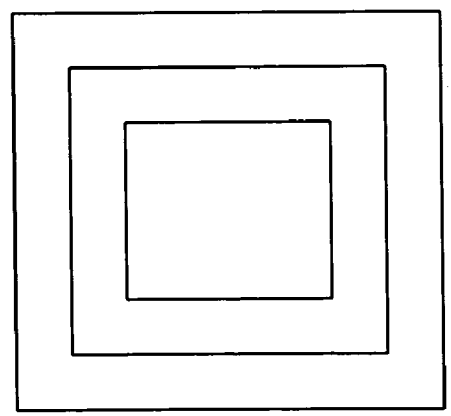

FIGS. 7A-7D illustrate a variety of other time line shapes that may be used. In more detail, FIG. 7A illustrates a Snowmanshaped time line. This particular time line may be desired by the user during the Christmas season. FIGS. 7B, 7C and 7D illustrate a star-shaped, rectangular-spiraled-shaped, and a square-shaped time line, respectively. As discussed above, the mobile terminal provider may provide the different shaped time line to the user via the Internet, or the time lines may be pre-stored in the memory of the terminal Further, as noted above, the different shaped time lines are displayed on the display 2. In addition, events detected by the event detector 11 can be directly displayed on the time lines without passing through the event collector 12. That is, the event controller 13 directly displays events detected by the event detector 11 on the time lines on the display 2.

As discussed above, in the event display apparatus and method for a mobile communication terminal in accordance with embodiments of the present invention, various dispersed or separate events stored in the memory of the terminal are collected and displayed on the time lines, thereby allowing a user to easily certify and manage the events. Further, the collected events are displayed on the time lines for representing a past, present, and future times, thereby allowing the user to easily certify and manage the events related to the past, present, and future times. Also, a variety of different shaped time lines may be provided to the user.

In addition, the above described time lines are particularly advantageous because several dispersed events (past, present or future events) may be displayed in a small area. That is, the mobile terminal is a relatively compact device that includes a relatively compact display. According to the present invention, a plurality of dispersed events may be displayed on a relatively compact display.

In addition, as discussed above, the present invention handles a variety of call events in addition to scheduling events. That is, the present invention advantageously collects and displays call events such as missed, sent or received call events in addition to scheduling events, alarm events, etc. Thus, the user is able to easily recognize and manage the plurality of call events in addition to the other events.

In addition, the mobile terminal may be a mobile phone, a Personal Digital Assistant, a User Equipment (UE), etc. Further, the call related various events include at least one from a voice call history and a data call history. The data call history includes at least one from a short message service (SMS) data call, a multimedia service (MMS) data call, a wireless application protocol (WAP) call, a Video telephony (VT) call, a Digital Mobile Broadcasting (DMB) call, an Instant Messaging Service (IMS) call and a Push To Talk (PTT). In addition, the voice call history includes at least one from a missed call event, a sent call event, and a received call event.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal, comprising:
a memory unit configured to store a time information of each of the plurality events;
a display configured to display a time line;
an event detector configured to detect a plurality of events;
an event collector configured to collect the detected events; and
a event controller configured to display the time line on the display unit of the mobile communication terminal and positioning the collected plurality of events on the timeline based on the time information of each of the plurality of events;
wherein the event controller is further configured to display a plurality of same events occurring at a same time as a single icon with a numeral at the icon indicating a number of the plurality of events occurring at the same time and to display a plurality of different events occurring at a same time as a single icon with a highest priority overlapping other icons corresponding to events having a lower priority,
wherein all of the collected plurality of events on the timeline is displayed in one screen.

2. The terminal of claim 1, wherein the plurality of events comprises at least one call related event comprises at least one from a voice call history and a data call history.

3. The terminal of claim 2, wherein the data call history comprises at least one from a short message service (sms) data call, a multimedia service (mms) data call, a wireless Application Protocol (wap) call, a Video telephony (vt) call, a Digital Mobile Broadcasting (dmb) call, an Instant Messaging Service (ims) call and a Push To Talk (ptt) call.

4. The terminal of claim 2, wherein the voice call history comprises at least one from a missed call event, a sent call event, and a received call event.

5. The terminal of claim 1, wherein the plurality of events comprises scheduling events, alarm events, wakeup call events, task events, D-day events, and reservation message events, and
wherein the event controller displays an icon corresponding to the collected event on the display unit and positions the icon on the time line.

6. The terminal of claim 1, wherein when the displayed at least one event is selected, the event controller displays a menu list with at least one executable process such that a user can select the at least one executable task to have the task executed.

7. The terminal of claim 6, wherein the at least one executable process comprises a perform call process, a send message process, a delete event process, and change a size or color of event process.

8. The terminal of claim 1, wherein the event controller displays a current time on the time line.

9. The terminal of claim 1, wherein the event controller changes a position of the at least one call related event displayed on the time line as time elapses.

10. The terminal of claim 1, wherein the event controller changes a size of the icons displayed on the time line as time elapses.

11. The terminal of claim 1, wherein the time line comprises a circular-shaped time line, a chart-shaped time line, a spiral-shaped time line, a snowman-shaped time line, a star-shaped time line, a rectangular-spiral-shaped time line, or a square-shaped time line.

12. The terminal of claim 11, wherein the circular-shaped time line comprises a first circular time line for representing a present time, a second circular time line for representing a past time, and a third circular time line for representing a future time.

13. The terminal of claim 12, wherein the first, second and third circular time lines have a different diameter, respectively.

14. The terminal of claim 11, wherein the circular-shaped time line comprises a first circular time line for representing a present morning time, a second circular time line for representing a present afternoon time, a third circular time line for representing a future morning time and a fourth time line for representing a future afternoon time.

15. The terminal of claim 14, wherein the first, second, third and fourth circular time lines have a different diameter, respectively.

16. The terminal of claim 11, wherein the spiral-shaped time line comprises a first spiral time line for representing a present time, a second spiral time line for representing a past time, and a third spiral time line for representing a future time.

17. The terminal of claim 11, wherein the spiral-shaped time line comprises a first spiral time portion for representing a present morning time, a second spiral time portion for representing a present afternoon time, a third spiral time portion for representing a future morning time and a fourth spiral time portion for representing a future afternoon time.

18. The terminal of claim 1, wherein when a specific time on the time line is selected, the event controller sets a requested event on the specific time.

19. The terminal of claim 1, wherein when a specific event displayed on the time line is selected by a user, the event controller performs the selected specific event according to the user's request.

20. The terminal of claim 1, wherein when a specific event displayed on the time line is selected by a user, the event controller displays detailed information about the selected specific event.

21. The terminal of claim 11, wherein the event controller prompts a user to select one of the circular-shaped time line, the chart-shaped time line, the spiral-shaped time line, the snowman-shaped time line, the star-shaped time line, the rectangular-spiral-shaped time line, or the square-shaped time line to display on the display of the terminal.

22. The terminal of claim 11, wherein the event controller prompts the user selects one of circular-shaped time line, the chart-shaped time line, the spiral-shaped time line, the snowman-shaped time line, the star-shaped time line, the rectangular-spiral-shaped time line, or the square-shaped time line to be a default time line to be displayed on the display of the terminal.

23. An event display method of a mobile communication terminal, comprising the steps of:

detecting a plurality of events in the mobile communication terminal;
collecting the detected event; and
displaying a time line on a screen of the mobile communication terminal; and
positioning the collected plurality of events on the timeline based on a time information of each of the plurality of events
wherein a plurality of same events occurring at a same time are displayed as a single icon with a numeral at the icon indicating a number of the plurality of events occurring at the same time, and
a plurality of different events occurring at the same time are displayed as a single icon with a highest priority overlapping other icons corresponding to events having a lower priority,
wherein all of the collected plurality of events on the timeline is displayed in one screen.

24. The event display method of claim 23, wherein the step of positioning the collected event on the timeline is a step of positioning an icon representing the event on the timeline.

25. The event display method of claim 23, wherein position of the icon is changed on the time line as time elapses.

26. The event display method of claim 23, wherein the timeline is any one of a circular-shaped timeline, a chart-shaped timeline, or a spiral-shaped timeline.

27. The event display method of claim 23, wherein the timeline comprises a first timeline representing present time zone, and a second timeline representing past time zone and a third timeline representing further time zone.

28. The event display method of claim 23, further comprising the step of setting an event requested by the user to a specific time when the specific time of the timeline is selected by a user.

29. The event display method of claim 23, wherein a position of the at least one events is changed from a first timeline to a second timeline on the time line as time elapses, wherein the first and second time line is separated each other.

* * * * *